United States Patent [19]
Longaker

[11] Patent Number: 5,978,313
[45] Date of Patent: Nov. 2, 1999

[54] TIME SYNCHRONIZATION FOR SEISMIC EXPLORATION SYSTEM

[75] Inventor: Harold L. Longaker, Houston, Tex.

[73] Assignee: Trimble Navigaiton Limited, Sunnyvale, Calif.

[21] Appl. No.: 08/941,646

[22] Filed: Sep. 30, 1997

[51] Int. Cl.⁶ .................................................. G01V 1/38
[52] U.S. Cl. ............................... 367/38; 367/76; 367/79; 367/50; 367/19; 367/20; 181/107
[58] Field of Search ................................ 367/14, 15, 55, 367/17, 38, 76, 79, 50, 19, 20; 181/107

[56] References Cited

U.S. PATENT DOCUMENTS

| | | | |
|---|---|---|---|
| 3,465,286 | 9/1969 | Stone | 367/50 |
| 3,624,599 | 11/1971 | Hibbard . | |
| 5,276,655 | 1/1994 | Rialan et al. . | |
| 5,479,351 | 12/1995 | Woo et al. . | |
| 5,510,797 | 4/1996 | Abraham et al. . | |
| 5,548,562 | 8/1996 | Helgerud et al. | 367/14 |
| 5,550,787 | 8/1996 | Rialan et al. . | |
| 5,642,285 | 6/1997 | Woo et al. . | |
| 5,650,981 | 7/1997 | Jacobsen et al. | 367/19 |
| 5,724,241 | 3/1998 | Wood et al. . | |

*Primary Examiner*—Christine Oda
*Assistant Examiner*—Anthony Jolly
*Attorney, Agent, or Firm*—Blakely, Sokoloff, Taylor & Zafman LLP

[57] ABSTRACT

A system and method for synchronizing collection of seismic data used for seismic surveys. In one embodiment, positioning signals received from a positioning system, such as the Global Positioning System, are used to acquire a highly accurate time value. Data collection is then initiated at a prespecified time using the time determined from the positioning signal.

23 Claims, 4 Drawing Sheets

TIME SYNCHRONIZATION FOR SEISMIC EXPLORATION SYSTEM

BACKGROUND OF THE INVENTION

1. Field of the Invention

The present invention relates to the field of seismic exploration. More particularly, the present invention relates to the time synchronization of data collected from multiple devices used in seismic exploration.

2. Art Background

In the art of seismic exploration energy generated by an artificial source is transmitted through the earth as seismic waves. At discontinuities within the earth the waves become partially reflected and consequently can be detected at the earth's surface with sensors such as geophones.

In land seismic surveys, hundreds to thousands of geophones may be deployed in a spatially diverse manner. Typically, several geophones are connected in a parallel-series combination on a single twisted pair of wires to form a single geophone group or channel. During the data collection process, the output from each channel is digitized and recorded for subsequent analysis.

The geophysical analysis of the recorded data requires knowledge of the precise locations of both the energy source creating the seismic waves and the channels or geophone groups detecting their reflections. If there are differences between the actual locations and the values for location used in data processing there could be problems with the analysis.

Typically, groups of geophones are placed at preplanned and presurveyed locations. The groups are usually connected to cables which in turn transport the collected data to recorders located at a central location. Alternately, some geophones systems transmit the collected data back via a radio link. As noted above the energy generated by the seismic energy source radiates in all directions.

In addition to pinpointing the locations of the geophones, it is important to synchronize the data received from the different numerous locations. The scientist analyzing the data is interested in the energy that gets reflected back towards the surface from the various stratigraphic layers and fault lines. The relative time of arrival at the geophones of these reflected signals of seismic sources is mapped over the prospect area. This mapping enables a map of the underlining earth's structure to be made. It is apparent that the geophones and associated recording devices must have data and time synchronization. Most systems specify timing accuracies in the order of tenths of microseconds.

Typically, systems use a tone issued by a single device, such as a central recording device or controller, to trigger time synchronization between the geophones/recording devices. For example, in cable-based systems a tone is sent down the cable to all geophones signaling the geophones to commence recording. When a single hop radio link is used, a tone is sent over the air to the geophones. Thus, using a tone based approach there is no need for explicit time specification.

However, there are situations where a tone based system to synchronize data collection is not adequate. One case is where the connections between the controller generating the tone and the geophones is via a packet radio link. This particularly is problematic when multiple hops are required to reach some of the geophones. A second situation is where neither cable or radio can be used and each geophone must record and operate in an autonomous manner. In this situation, the use of a clock with each geophone is required. However, time synchronization must be on the order of a few tenths of a microseconds; therefore a crystal clock would not suffice. Thus, it is desirable to provide a synchronization system that is not restricted by the above limitations.

SUMMARY OF THE INVENTION

An innovative technique for using time signals for time synchronization of seismic collection is described. In one embodiment, the positioning signals received via the global positioning system (GPS) are used to provide an accurate time value to the data collection devices. Data collection is initiated based on a prespecified time. Thus, data collection is initiated at the prespecified time using the time determined from the GPS signal.

BRIEF DESCRIPTION OF THE DRAWINGS

The objects, features and advantages of the present invention will be apparent to one skilled in the art from the following detailed description in which.

DETAILED DESCRIPTION

In the following description, for purposes of explanation, numerous details are set forth in order to provide a thorough understanding of the present invention. However, it will be apparent to one skilled in the art that these specific details are not required in order to practice the present invention. In other instances well known electrical structures and circuits are shown in block diagram form in order not to obscure the present invention unnecessarily.

Figure 1:
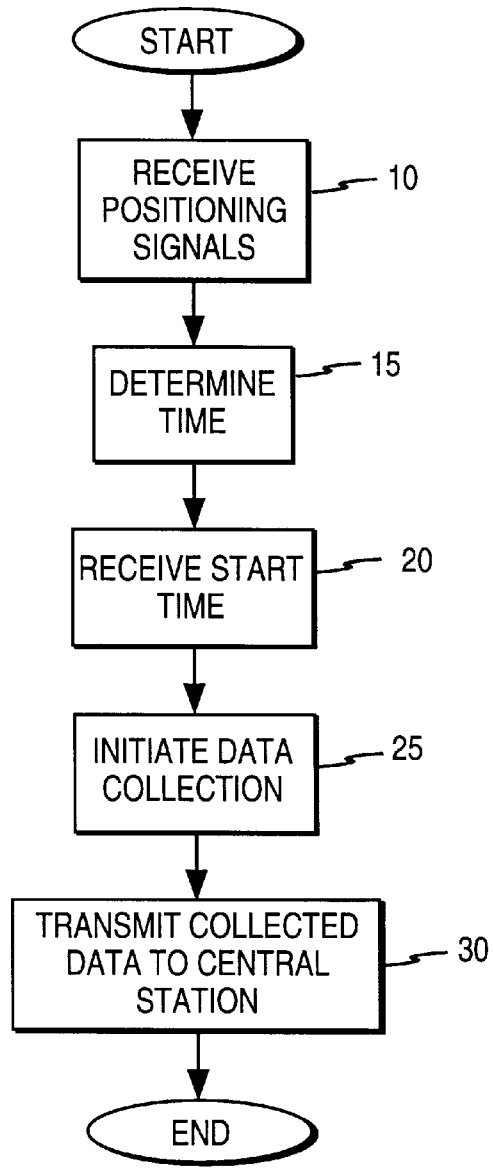
FIG. 1 is a simplified flow diagram of one embodiment of the method of the present invention.

The system and method of the present invention provides an innovative way for synchronizing and collecting seismic data from a plurality of locations in a seismic field into which a seismic signal is transmitted. A simplified block diagram of one embodiment of the process is described with reference to FIG. 1. At step 10 timing signals are received from a system. Preferably, the timing signals are positioning signals received from a positioning system that include position information and time information. An example of a positioning system is the Global Positioning System. Other positioning systems including GLONASS and Psuedolites can be used.

Using the positioning signals received, an accurate time value is determined at step 15. At step 20 the prespecified start time is received. As will be described later, this prespecified start time may be a value preprogrammed into the data collection device, sent some time during the initialization process for the data collection device or sent some time prior to the time to begin collection. When the time 15 is the same as the predetermined start time, then data collection is initiated at step 25. Optionally, at step 30, the collected data is transmitted back to a central station or controller for subsequent processing. Alternately, the data collected can be downloaded at a later time via a wireless, wired, or other transmission media means.

Figure 2:
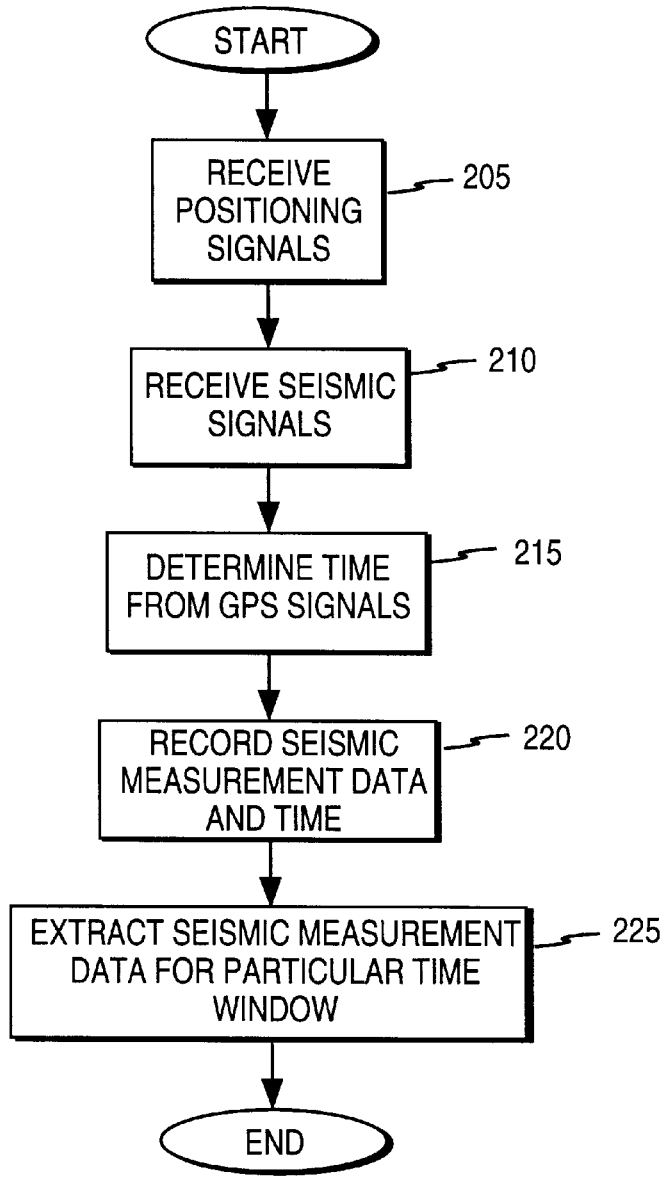
FIG. 2 is a simplified flow diagram of an alternate embodiment of the method of the present invention.

FIG. 2 is a simplified flow diagram of an alternate embodiment. FIG. 2 is a simplified flow diagram of a system which has no connection to the central device for obtaining the predetermined time and does not maintain a programmed value for the predetermined time. At step 205, the positioning system signals are received, and at step 210, seismic signals are co-received. The time is determined, step 215, from the positioning signal. Measurement data is generated from the seismic signals and the measurement data and corresponding time determined from the positioning signals are recorded, step 220.

Subsequently, the recorded data is downloaded from the measurement device that recorded the measurement data and the records are searched to find the time corresponding to the start of the event of interest (e.g., seismic event). The time synchronization can then be obtained through post processing to extract the relevant measurements, step 225 and time synchronization can be achieved with other measurement devices which operate according to this method, or other methods (such as those described in FIG. 1) without the requirement of sending a prespecified time to all the measurement devices.

Figure 3A:
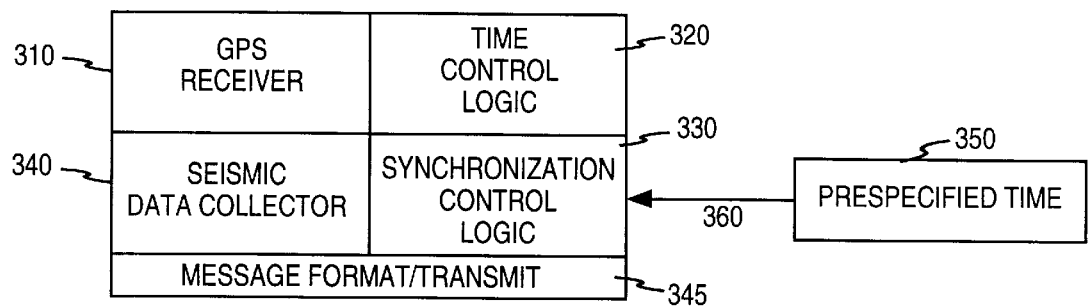
FIGS. 3a, 3b and 3c are simplified block diagrams of illustrating embodiments of data collection devices that operates in accordance with the teachings of the present invention.

FIG. 3a illustrates a simplified block diagram of one embodiment of a data collection device that operates in accordance with the teachings of the present invention. The GPS receiver 310 receives the positioning signals recording well known GPS receiver techniques. Time control logic 320 computes the precise time from the collected positioning signals. The computation of the time from the GPS signals is well known and will not be discussed further herein. Synchronization control logic 330 initiates the seismic data collector 340 to collect seismic data when the prespecified time 350 sent via connection 360 is equal to the time information generated by time control logic 320. The prespecified time may be transferred via a wireless link, such as a radio link, or preprogrammed into the device 360. Once the measurement data is collected, the data then may optionally be transferred to a central processing device by, for example, formatting the data into messages and transmitting the messages to the central processing device using block 345.

Figure 3B:
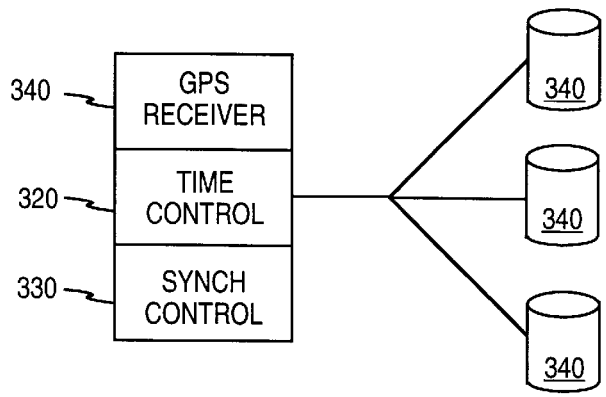

A number of variations may be realized, for example as shown in FIG. 3b. The GPS receiver, 310 time control logic 320 and synchronization control logic 330 may be incorporated into a single device which controls the plurality of data collectors 340. The data collectors 340 may consist of geophones and connected data recording devices. As noted above, the recording mechanism may be localized, centralized as well as stand alone.

Figure 3C:
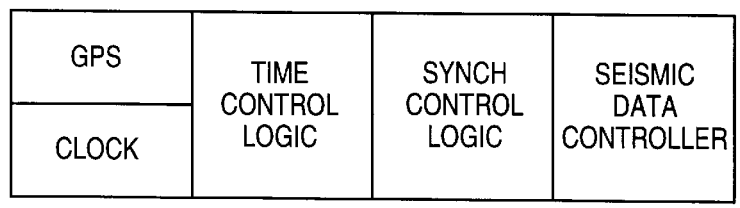

Still another embodiment, as illustrated in FIG. 3c, uses an internal clock which is updated periodically in accordance with the time determined by time control logic. Synchronization control logic operates in the same manner described above to initiate collection at a time controlled by the time determined from the positioning signal.

Figure 4:
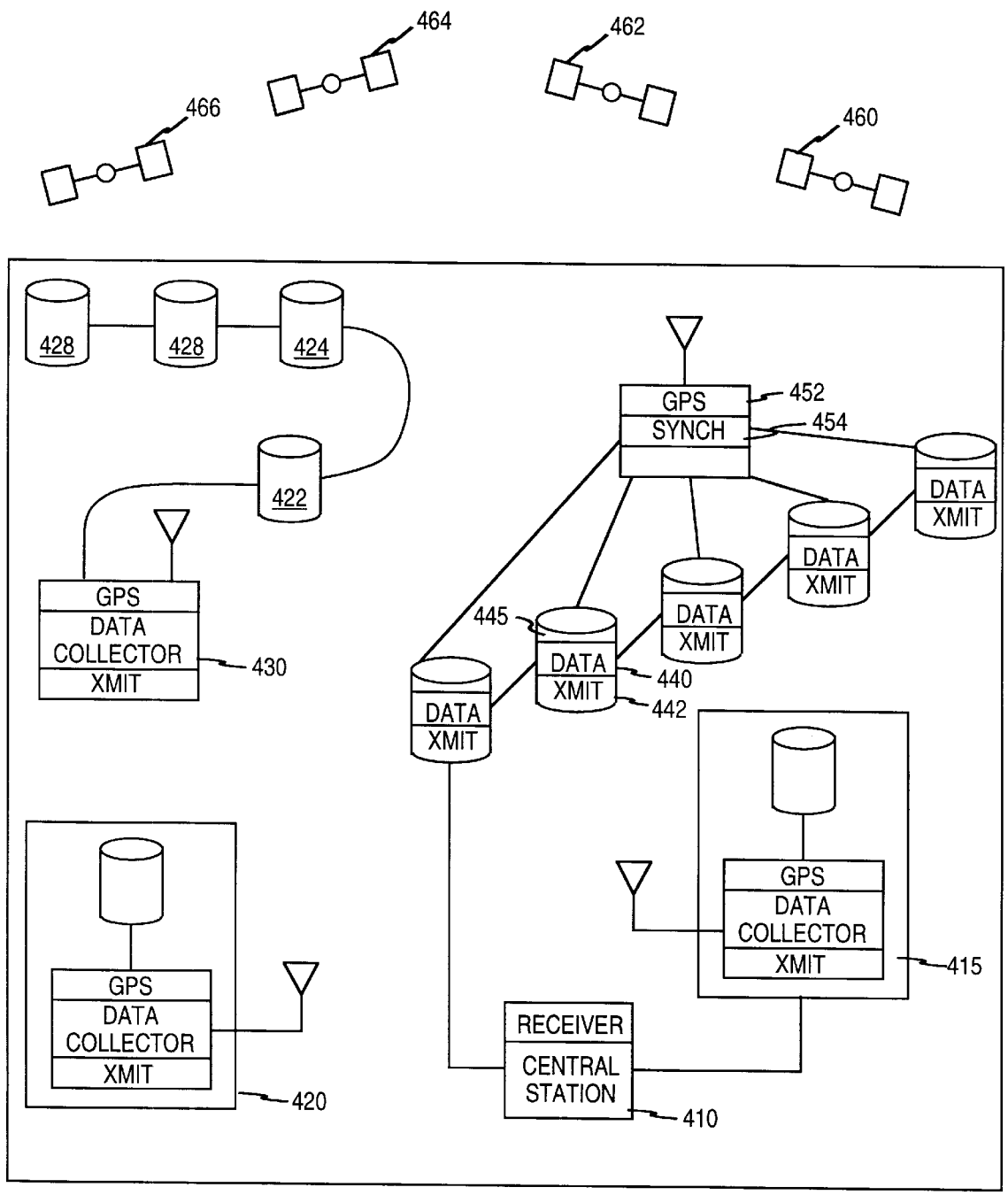
FIG. 4 is a block diagram representation of an exemplary survey site that operates in accordance with different embodiments of the system of the present invention.

FIG. 4 is the simplified block diagram of a system implementing the seismic data collection system in accordance with the teachings of the present invention. As is readily apparent from the drawing, the data collection devices may or may not be physically connected to the central station. For example, the central station 410 may be coupled to a data collection device 415 via a hard connection such as a twisted pair link. Alternately, the central station 410 may be connected to a data collection device 420 through a wireless link.

In some cases, as described earlier, the synchronization circuitry, positioning system receiver and other functionality may be centralized to support a plurality of devices 422, 424, 426, and 428. The central device 430 then functions to initiate collection, collect the data and transmit the data back to the central station 410. Alternately, certain functionality such as the data collection and transmitter 440 and 442, may be localized at each data collection device 445 and the positioning system receiver 452 and synchronization logic 454 are centralized to indicate when to initiate data collection. As noted previously in one embodiment, GPS which consists of a number of satellites 460, 462, 464, 466 transmitting positioning signals is used to provide time information for synchronization.

The invention has been described in conjunction with the preferred embodiment. It is evident that numerous alternatives, modifications, variations, and uses will be apparent to those skilled in the art in light of the foregoing description.

What is claimed is:

1. A system for synchronizing and collecting seismic data from a plurality of locations in a seismic field in which a seismic signal is transmitted, said system comprising:

a plurality of seismic sensor devices configured to collect seismic information based upon the seismic signal transmitted;

at least one positioning system receiver configured to receive positioning signals and timing information;

time control logic configured to compute a time based upon the received timing information;

a seismic data collection device configured to generate a plurality of records of measurement data comprising seismic information and the time of collection of the seismic information, said time determined by the time control logic;

a post processor configured to receive the records of measurement data and extract records comprising a time of collection within a specified time window of interest.

2. The system as set forth in claim 1, wherein the specified time window of interest is identified after data collection.

3. A method for synchronizing and collecting seismic data from a plurality of locations in a seismic field in which a seismic signal is transmitted, said method comprising the steps of:

receiving signals from a positioning system, said signals comprising timing information;

determining a time based upon the timing information;

collecting seismic data at approximately the time signals are received from the positioning system;

generating data records comprising seismic data and the approximate time of collection determined from the timing information;

post processing the data records to extract data records comprising a time within a specified window of interest.

4. The method as set forth in claim 3, wherein the specified window of interest is identified after the step of generating data records.

5. The system as set forth in claim 1, wherein at least one of the seismic sensor devices comprises the synchronization logic.

6. The system as set forth in claim 1, wherein at least one of the seismic sensor devices comprises the receiver.

7. The system as set forth in claim 1, wherein the positioning system receiver comprises the time control logic.

8. The system as set forth in claim 1, further comprising at least one transmitter configured to transmit seismic data collected.

9. The system as set forth in claim 1, further comprises a central station to collect the transmitted seismic data collected by the plurality of seismic sensor devices.

10. The system as set forth in claim 1, wherein the receiver is a Global Positioning System Receiver.

11. The method as set forth in claim 3, further comprising the step of transmitting the data collected to a central station.

12. The method for synchronizing as set forth in claim 3, further comprising the step of the at least one seismic collection device transmitting data collected to a central station.

13. A system for collecting seismic data from a plurality of locations in a seismic field in which a seismic signal is transmitted, said system comprising:

a plurality of seismic sensor devices configured to collect seismic information based upon the seismic signal transmitted;

at least one positioning system receiver configured to receive positioning signals and timing information;

time control logic configured to compute a time based upon the received timing information;

a seismic data collection device configured to generate a plurality of records of measurement data comprising seismic information and the time of collection of the seismic information, said time determined by the time control logic; and an output configured to output the records of measurement data.

14. The system as set forth in claim 13, further comprising a post processor configured to receive the records of measurement data and extract records comprising a time of collection within a specified window of interest.

15. The system as set forth in claim 14, wherein the post processor is coupled to the output.

16. The system as set forth in claim 13, wherein the specified time window of interest is identified after data collection.

17. The system as set forth in claim 13, wherein at least one of the seismic sensor devices each further comprise the time control logic.

18. The system as set forth in claim 13, wherein at least one of the seismic sensor devices comprises the receiver.

19. The system as set forth in claim 13, further comprises a central station to collect the transmitted seismic data collected by the plurality of seismic sensor devices.

20. A method for collecting seismic data from a plurality of locations in a seismic field in which a seismic signal is transmitted, said method comprising the steps of:

receiving signals from a positioning system, said signals comprising timing information;

determining a time based upon the timing information;

collecting seismic data at approximately the time signals are received from the positioning system;

generating data records comprising seismic data and the approximate time of collection determined from the timing information; and outputting the records of measurement data.

21. The method as set forth in claim 20, further comprising the step of post-processing the data records to extract data records comprising a time within a specified window of interest.

22. The method as set forth in claim 21, wherein the specified window of interest is identified after the step of generating data records.

23. The method as set froth in claim 20, further comprising the step of the at least one seismic collection device transmitting data collected to a central station.

* * * * *